May 22, 1934.
S. B. HASELTINE
1,959,582
FRICTION SHOCK ABSORBING MECHANISM
Filed Aug. 29, 1931
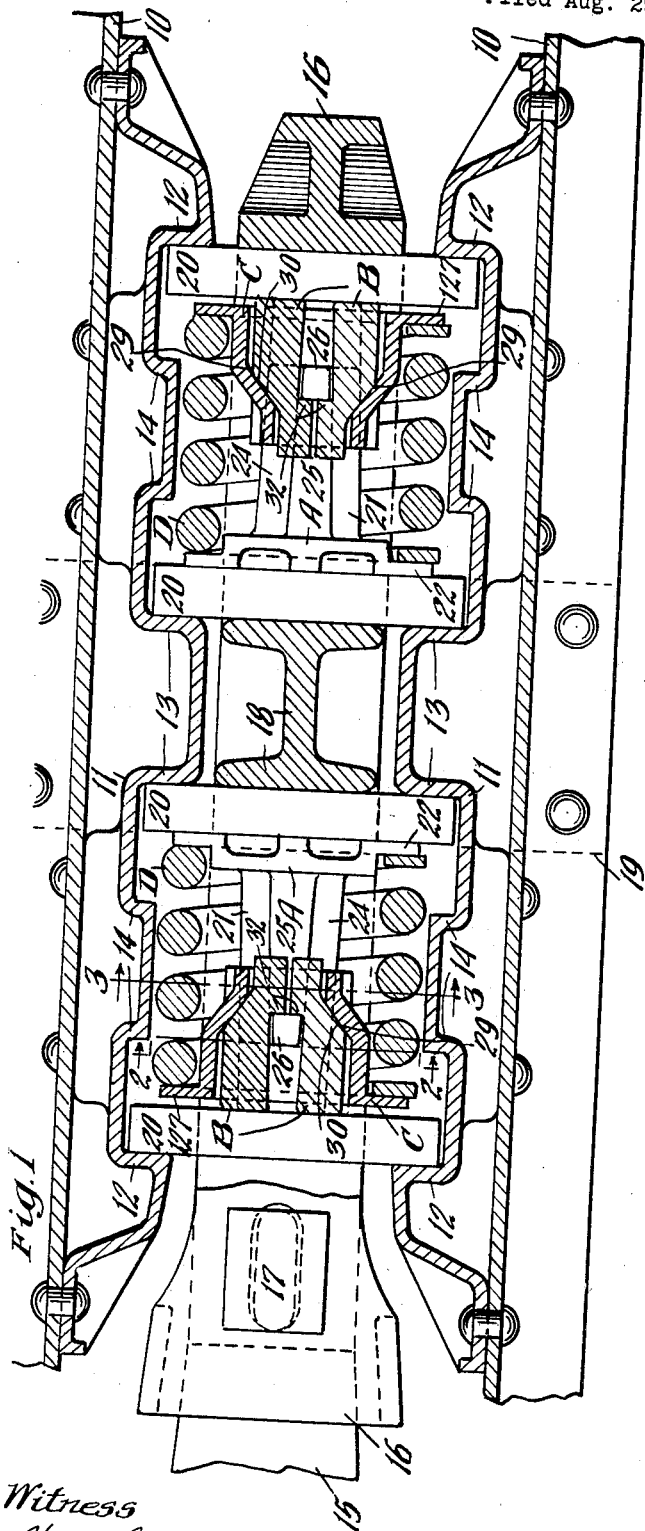
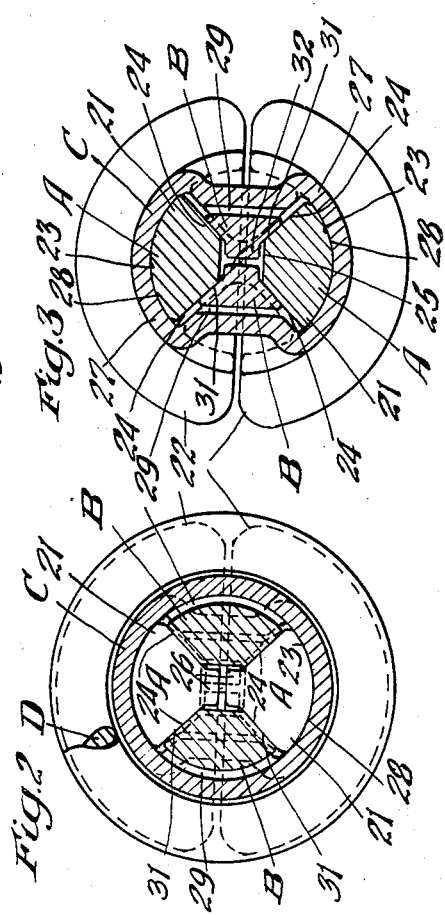
Witness
Wm. Geiger
Inventor
Stacy B. Haseltine
By Henry Fuchs
Atty.

Patented May 22, 1934

1,959,582

UNITED STATES PATENT OFFICE 1,959,582

FRICTION SHOCK ABSORBING MECHANISM

Stacy B. Haseltine, Chicago, Ill., assignor to W. H. Miner, Inc., Chicago, Ill., a corporation of Delaware Application August 29, 1931, Serial No. 560,129

11 Claims. (Cl. 213—22)

This invention relates to improvements in friction shock absorbing mechanisms.

One object of the invention is to provide a friction shock absorbing mechanism in the form of a friction unit of high capacity and simple construction adapted for use in connection with railway draft riggings having tandem stop castings of that type usually employed in connection with tandem spring gears, the unit being so designed as to replace the spring members, thereby providing greatly increased shock absorbing capacity over the spring gear.

Another object of the invention is to provide a friction shock absorbing unit comprising a pair of friction members and a cooperating pair of friction wedge blocks, together with means which is yieldingly resisted, for forcing said wedge blocks into tight frictional engagement with the friction members, wherein the means for forcing the wedge blocks into said frictional engagement is in the form of a spring follower having interior friction surfaces and the friction wedge blocks are so designed as to force the friction members apart and into tight frictional engagement with the friction surfaces of the spring follower, thereby providing frictional engagement between both the wedge blocks and friction members and between the friction members and spring follower, thus obtaining frictional engagement on relatively large surface areas when considering the size of the gear.

Other objects of the invention will more clearly appear from the description and claims hereinafter following.

In the drawing, forming a part of this specification, Figure 1 is a horizontal, longitudinal sectional view through the underframe structure of a railway car, illustrating my improvements in connection therewith. And Figures 2 and 3 are vertical, transverse sectional views, corresponding respectively to the lines 2—2 and 3—3 of Figure 1, the sills, side castings, yoke, and main followers being omitted in these views.

In said drawing, 10—10 indicates channel-shaped center or draft sills of the railway car underframe to the inner sides of which are secured tandem stop castings 11—11 of well-known form. Each stop casting 11 has the usual front and rear main stop shoulders 12—12, a pair of middle main stop shoulders 13—13, and two sets of front and rear intermediate limiting stop shoulders 14—14 and 14—14. The coupler of the railway draft rigging, the shank only of which is shown, is indicated by 15 and is connected to the usual vertical yoke 16 by means of a vertical key 17. The yoke 16 is provided with the usual filler block 18 between the top and bottom arms thereof, said block being formed rigid with the arms. The yoke is supported by a saddle plate 19 fixed to the bottom flanges of the draft sills. Within the yoke are the usual pairs of front and rear main followers 20—20 and 20—20. In the railway draft rigging illustrated in the drawing, I employ two friction shock absorbing mechanisms, which are substituted for the usual front and rear springs of the tandem rigging and cooperate with the two pairs of front and rear followers 20—20 and 20—20. The two friction shock absorbing mechanisms, as shown, are reversely arranged but are of similar design. Each of my improved friction shock absorbing mechanisms comprises broadly two friction members A—A, two friction wedge blocks B—B, a spring follower C, and a main spring resistance D.

The two friction members A—A are of like design and bear directly on one of the main followers 20 of one of said pairs. Each friction member A comprises a longitudinally disposed postlike section 21 having the rear end provided with a laterally extending flange 22, which forms a spring abutment and bears on the cooperating main follower 20. The flanges 22—22 of the two members A together form a substantially annular flange which surrounds these members. The post section 21 of each member A is of the cross-section shown in Figures 2 and 3, that is, the same has a longitudinally extending, outer curved friction surface 23 and an inner friction surface of V-shaped cross-section comprising the friction faces 24—24 which extend lengthwise of the mechanism and are separated by a surface 25. The faces 24—24 preferably converge outwardly of each post section 21. At the free ends, the sections 21—21 of the members A—A are provided with inwardly projecting retaining lugs 26—26, which cooperate with the friction wedge blocks B—B, in a manner hereinafter described, to limit outward movement of these blocks.

The spring follower C comprises a sleevelike section 27, which is telescoped over the friction members A—A. At the outer end, the spring follwer C is formed with an annular abutment flange 127 for the spring resistance D. On the interior, the sleeve section of the spring follower is provided with two opposed longitudinally extending, curved friction surfaces 28—28, which cooperate with the curved friction surfaces 23—23 of the two friction members A—A. The spring follower C has the sleevelike portion thereof also provided with a pair of opposed interior wedge faces 29—29, which cooperate with the friction wedge blocks B—B.

The friction wedge blocks B—B are of the cross-sectional shape illustrated in Figure 2 and are arranged on opposite sides of the friction members A—A, within the sleevelike section of the spring follower C. Adjacent the rear end, each friction wedge block is provided with a wedge face 30, which cooperates with the wedge face 29 at the corresponding side of the spring follower. On the inner side, each friction wedge block is provided with a V-shaped friction surface formed by the faces 31—31 which are correspondingly inclined to and cooperate with the faces 24—24 at the corresponding sides of the two friction members A—A. As will be evident, due to the radial arrangement of the cooperating friction surfaces or faces of the friction members A—A and the friction blocks B—B, the friction members A—A will be wedged apart when the blocks are forced laterally inwardly toward each other due to the wedging action between the same and the wedge faces of the spring follower C. The outer ends of the friction wedge blocks B—B bear directly on the corresponding main follower 20, and the parts are so proportioned that the flange 127 of the spring follower C is normally slightly spaced from said main follower 20. At the inner ends, the friction wedge blocks B—B have interior shoulders 32—32, which engage with the retaining lugs 26—26 of the members A—A in full release position of the parts, thereby limiting outward movement of the friction wedge blocks B—B and expansion of the mechanism.

The spring resistance D is in the form of a relatively heavy coil surrounding the friction members A—A and the sleevelike section of the spring follower C. The opposite ends of the spring D bear respectively on the flange 127 of the spring follower C and the flanges 22—22 of the friction members A—A. As will be understood, in the operation of the railway draft rigging, the front followers 20—20 of the two sets will be forced rearwardly in buff while the rear followers 20—20 are held against movement by engagement with the corresponding stop shoulders 13—13 and 12—12. During a draft action, the shock absorbing mechanisms will be compressed by the rear followers 20—20 being moved forwardly while the front followers 20—20 are held against movement by engagement with the corresponding stop shoulders 13—13 and 12—12.

During the compression of each shock absorbing mechanism, relative approach of the main followers 20—20 will cause the friction wedge blocks B—B and the friction members A—A to be moved relatively to each other lengthwise of the mechanism. Inasmuch as the blocks B—B have wedging engagement with the spring follower C, which is yieldingly resisted by the spring D, the friction wedge blocks will be forced laterally inwardly toward each other and into tight frictional engagement with the friction surfaces or faces 24—24 on the inner sides of the friction members A—A. Due to the V-shaped arrangement of the cooperating friction surfaces of the wedge blocks B—B and the friction members A—A, the latter will be forced apart and against the interior friction surfaces 28—28 of the spring follower C. During the continued relative movement of the friction blocks B—B and the friction members A—A, the blocks will slide on the friction surfaces of the members A—A and the spring follower C will slide on the outer friction surfaces 23—23 of the members A—A, while at the same time the spring D will be compressed. It will be evident that friction is thus created between the friction members A—A and the friction blocks B—B and between the former and the spring follower C and a differential action is had due to the inclination of the cooperating friction surfaces, thereby augmenting the resistance as compression progresses. In release, when the actuating force is reduced, the expansive action of the main spring D will force the spring follower and friction members A—A apart, thereby also moving the friction wedge blocks B—B outwardly until arrested in their movement by shouldered engagement with the lugs 26—26 of the members A—A. The parts will thus be restored to the full release position illustrated in Figure 1.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a pair of separate friction elements having longitudinally extending, transversely curved, outer friction surfaces, each of said elements having a spring abutment flange at the outer end thereof, each of said elements also having a longitudinally extending friction surface on the inner side thereof of V-shaped cross-section; of a spring follower having a sleeve portion provided with opposed interior curved friction surfaces and a pair of interior opposed wedge faces, said friction surfaces engaging the outer friction surfaces of said elements, said spring follower having a spring abutment flange at the outer end thereof; a spring resistance surrounding the friction elements and the sleeve portion of the spring follower, and having its opposite ends bearing on the flange of said spring follower and the flanges of said friction elements; and a pair of friction blocks alternated with said friction elements, said blocks having friction surfaces on the inner sides thereof of V-shaped cross-section engaging between the friction elements and cooperating with the friction surfaces on the inner sides of the latter, said blocks having wedge faces on the outer sides thereof engaging the wedge faces of the spring follower.

2. In a railway draft rigging, the combination with a pair of followers movable toward each other; of a pair of laterally separated friction elements bearing on one of said followers, each of said friction elements having a longitudinally extending, exterior friction surface and an inner longitudinally extending friction surface of V-shaped cross-section, said elements having spring abutments at the outer ends thereof; a spring follower having opposed interior friction surfaces and opposed interior wedge faces, said friction surfaces having frictional engagement with the outer friction surfaces of the friction elements; a spring surrounding said friction elements and having its opposite ends bearing on the spring follower and spring abutments of the friction elements; and a pair of friction blocks having friction surfaces on the inner sides thereof of V-shaped section engaging between the friction elements and cooperating with the friction surfaces on the inner sides of the latter, said blocks having wedge faces on the outer sides thereof engaging the wedge faces of the spring follower, said blocks projecting outwardly of the spring follower and having their outer ends bearing on the other main follower, said last named main follower engaging the outer ends of the friction elements to limit relative approach of the main followers and compression of the mechanism.

3. In a friction shock absorbing mechanism, the combination with a pair of tapered friction elements, each having a longitudinally extending, exterior friction surface and inner longitudinally extending surfaces of V-shaped cross-section, said V-shaped surface of each element having the faces thereof converged outwardly of said element, said elements having spring abutments at the outer ends thereof; of a spring follower having opposed interior friction surfaces and opposed interior wedge faces, said friction surfaces having frictional engagement with the exterior friction surfaces of the friction elements; a spring surrounding said friction elements and having its opposite ends bearing on the spring follower and spring abutments of the friction elements; and a pair of friction blocks having wedging engagement with the wedge faces of the spring follower, each of said blocks having a longitudinally extending, interior friction surface on the inner side thereof, said friction surface being of V-shaped cross-section and having the faces thereof inclined to the longitudinal axis of the mechanism, said blocks being disposed on opposite sides of the friction elements and having the V-shaped friction surfaces thereof engaging between said elements and in sliding frictional contact with the inner surfaces of the latter.

4. In a friction shock absorbing mechanism, the combination with a set of friction members having exterior friction surfaces extending lengthwise of the mechanism, each friction member having a pair of friction surfaces on the inner side thereof lying in planes radial to the longitudinal axis of the mechanism; of a set of friction wedge members having exterior wedge faces, each friction wedge member having a pair of longitudinally extending friction surfaces on the inner side thereof engaging with the inner friction surfaces of two adjacent friction members, said set of friction members and said set of friction wedge members being relatively movable lengthwise of the mechanism to an extent at least equal to the total compression stroke of the mechanism, one of said sets being held stationary during a compression stroke of the mechanism, and the other set receiving the full actuating force and being moved lengthwise of said stationary set; a spring follower having a set of interior friction surfaces engaging the exterior friction surfaces of said friction members, said spring follower also having an interior set of laterally inwardly acting wedge faces having wedging engagement with the wedge faces of the wedge friction members; and spring resistance means bearing on said spring follower and opposing relative movement thereof and the friction members in a direction lengthwise of the mechanism.

5. In a friction shock absorbing mechanism, the combination with end followers movable toward and away from each other; of a set of friction members bearing on one of said end followers; a spring follower having friction surfaces engaging the friction members; a spring resistance opposing relative movement of said spring follower and friction members lengthwise of the mechanism; and a set of friction wedge members bearing on the other end follower and having wedging engagement with the spring follower and friction members to force the latter apart and into tight frictional engagement with the friction surfaces of the spring follower, said set of friction wedge members and set of friction members being relatively movable with respect to each other lengthwise of the mechanism upon relative movement of said end followers, one set of members being held stationary by one of said end followers during a compression stroke of the mechanism while the other set receives the actuating force and is moved lengthwise of the stationary set by the other end follower.

6. In a friction shock absorbing mechanism, the combination with end followers movable toward and away from each other lengthwise of the mechanism; of a pair of laterally separated friction elements movable with one of said end followers, each of said elements having a longitudinally extending, exterior friction surface and inner longitudinal friction surfaces in planes at an angle to each other, said elements having spring abutments at the outer ends thereof; a spring follower having opposed interior friction surfaces and opposed interior wedge faces, said friction surfaces having frictional engagement with the exterior friction surfaces of the friction elements; a spring surrounding said friction elements and having its opposite ends bearing on the spring follower and spring abutments of the friction elements; and a pair of friction blocks movable with the other end follower and having wedging engagement with the wedge faces of the spring follower to effect relative movement of the spring follower and friction elements in a direction lengthwise of mechanism and also forcing said blocks laterally inwardly toward each other, each of said blocks having a longitudinally extending, interior friction surfaces on the inner side thereof, said friction surface being disposed in planes at an angle to each other, said blocks being disposed on opposite sides of the friction elements and having the angularly disposed friction surfaces thereof engaging between said elements and in sliding frictional contact with the inner friction surfaces of the latter.

7. In a friction shock absorbing mechanism, the combination with a pair of followers at opposite ends of the mechanism, said followers being movable toward and away from each other; of a pair of friction members having exterior friction surfaces; a pair of friction wedge members engaging between said friction members for spreading the same apart, said first and second named pairs of members being movable lengthwise of the mechanism with respect to each other, said friction wedge members having exterior wedge faces, one pair of said members bearing on one of said followers and being movable in unison therewith and the other pair of said members bearing on the other follower and being movable in unison therewith; a spring follower having interior friction surfaces and interior wedge faces, the friction surfaces of said spring follower engaging with the exterior friction surfaces of said friction members, and the wedge faces of said spring follower engaging the wedge faces of said friction wedge members; and spring means abutting said spring follower and friction members and yieldingly opposing relative movement of said spring follower and said friction members in a direction lengthwise of the mechanism.

8. In a friction shock absorbing mechanism, the combination with followers at opposite ends of the mechanism, said followers being relatively movable toward and away from each other; of a set of friction members having longitudinally disposed exterior friction surfaces, said members abutting one of said followers; a spring follower having interior wedge faces and interior longitudinally disposed friction surfaces engaging with the exterior surfaces of said friction members; a spring resistance opposing relative movement of said spring follower and friction members lengthwise of the mechanism; and a set of friction wedge members abutting the other follower, said set of friction wedge members and said set of friction members being relatively movable lengthwise of the mechanism to an extent at least as great as the total compression stroke of the mechanism, one set of said sets of members being held against movement by engagement with one of said followers during a compression stroke of the mechanism and the other set of members directly engaging the other follower and receiving the actuating force therefrom and being moved lengthwise of the stationary set to an extent corresponding to the compression stroke of the mechanism, said set of friction wedge members having wedging engagement with the wedge faces of the spring follower and wedging engagement with said friction members to force the latter apart into tight frictional engagement with the friction surfaces of the spring follower.

9. In a friction shock absorbing mechanism, the combination with friction members extending lengthwise of the mechanism, from one end thereof to a point spaced from the other end a distance substantially equal to the compression stroke of the mechanism, each of said members having spring abutments at said first named end of the mechanism; of a spring follower at the second named end of the mechanism, said follower having interior friction surfaces and interior wedge faces at said second named end of the mechanism, said friction surfaces corresponding in number to said friction members and engaging with the friction members; a spring resistance bearing at opposite ends respectively on said spring follower and spring abutments of the friction members; friction blocks at said last named end of the mechanism normally projecting outwardly beyond the corresponding ends of the friction members, said blocks having wedge faces engaging the wedge faces of the spring follower, said blocks being movable lengthwise of the mechanism with respect to said friction members a distance corresponding to the full compression stroke of the mechanism and having longitudinally extending, laterally acting, friction wedge faces engaging between said friction members; and spring resistance means bearing at opposite ends respectively on said spring abutments of the friction members and said spring follower, and forcing said spring follower outwardly to press the wedge faces of the spring follower against the wedge faces of the blocks.

10. In a friction shock absorbing mechanism, the combination with laterally separated friction members, each having spring abutment means at the outer end; of a spring follower, said spring follower and friction members being movable toward and away from each other lengthwise of the mechanism, said spring follower having interior wedge faces and interior friction surfaces; friction wedge blocks movable lengthwise of the mechanism with respect to said friction members; means for moving said wedge blocks and friction members lengthwise of the mechanism with respect to each other to an extent corresponding to the full compression stroke of the mechanism, said blocks having wedge faces engaging with the wedge faces of the spring follower, said blocks also having wedging engagement with the friction members on surfaces radial to the longitudinal axis of the mechanism; and a spring resistance having the opposite ends bearing respectively on said spring abutment means and spring follower and forcing the latter outwardly against the wedge faces of the blocks.

11. In a friction shock absorbing mechanism, the combination with a pair of laterally separated friction elements having longitudinally disposed friction surfaces and spring abutments at the outer ends thereof, said friction surfaces being disposed at a slight angle with respect to the longitudinal axis of the mechanism; of a spring follower having a pair of opposed interior wedge faces disposed at a greater angle to said longitudinal axis than said friction surfaces, said spring follower also having a pair of opposed interior friction surfaces cooperating with the friction surfaces of said friction elements, said spring follower and friction elements being movable with respect to each other lengthwise of the mechanism; friction blocks movable lengthwise of the mechanism with respect to said friction elements, said blocks having wedge faces engaging the wedge faces of the spring follower to effect lateral approach of said blocks and relative longitudinal movement of the spring follower and friction elements when said blocks are moved inwardly of the mechanism, said blocks also having laterally acting longitudinally extending wedge faces in engagement with the friction elements to spread the same apart and into tight frictional engagement with the friction surfaces of the spring follower; and a spring resistance surrounding said friction elements having its opposite ends bearing on said spring follower and the spring abutments of the friction elements and forcing said spring follower outwardly to press the wedge faces thereof against the first named wedge faces of the blocks.

STACY B. HASELTINE.